Figure 1:
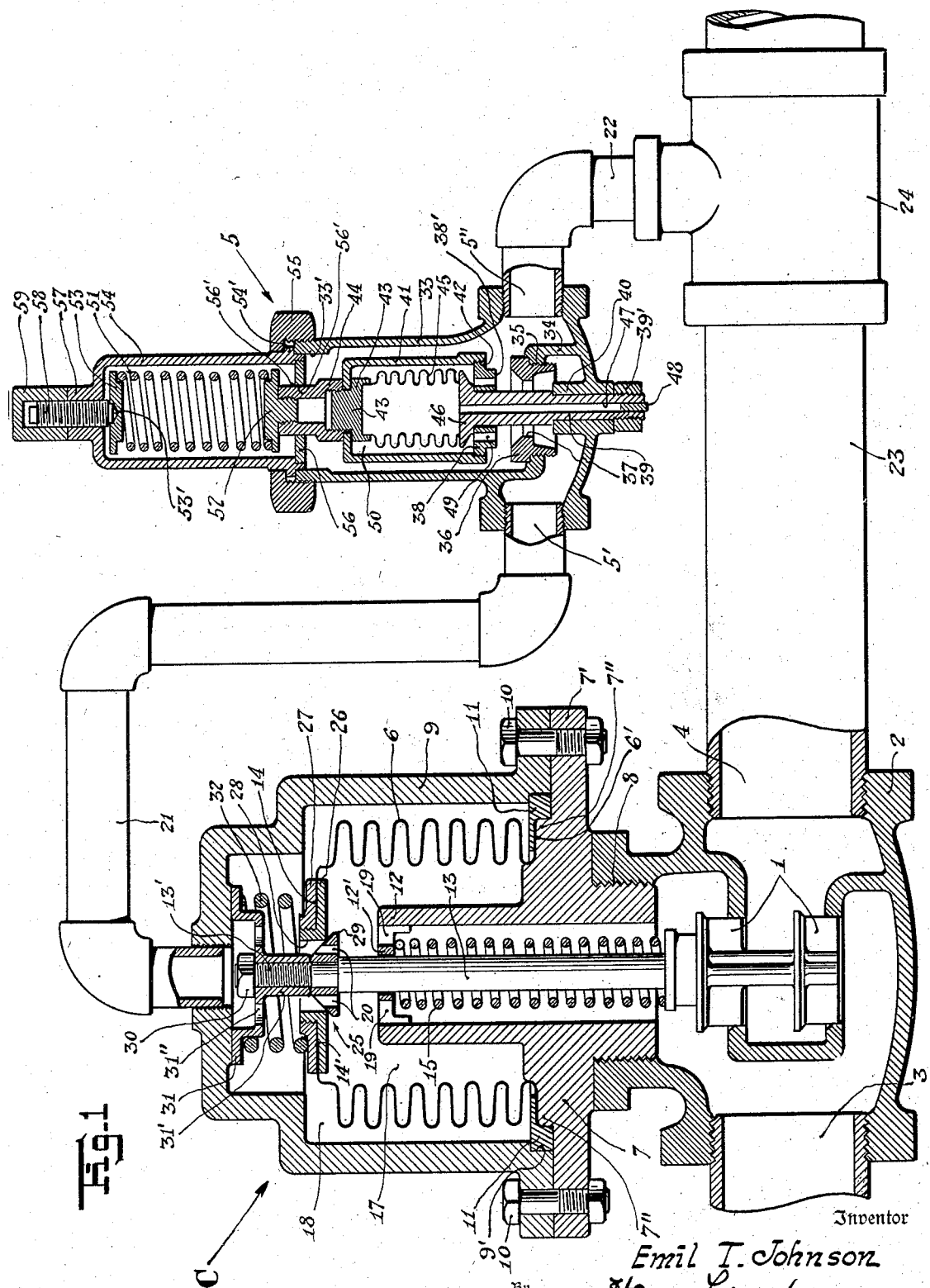

Feb. 23, 1943.   E. T. JOHNSON   2,312,251
FLOW REGULATOR
Filed Feb. 10, 1940   2 Sheets-Sheet 1

Inventor
Emil T. Johnson
Henry Lanahan
By
Attorney

Patented Feb. 23, 1943

2,312,251

UNITED STATES PATENT OFFICE 2,312,251

FLOW REGULATOR

Emil T. Johnson, West Orange, N. J., assignor to Thomas A. Edison, Incorporated, West Orange, N. J., a corporation of New Jersey Application February 10, 1940, Serial No. 318,203

15 Claims. (Cl. 236—80)

This invention relates to devices for regulating or controlling the flow of fluids, and more particularly to a small and improved construction of pilot-type self-operated regulating device. The invention is especially concerned with the provision in such regulating devices of improvements which will render the devices highly sensitive in operation and yet free from risk or damage to its parts when subjected to a wide range of operating conditions.

Regulating devices of the type controlled by pilot valves comprise a main valve which is operated by a pressure differential across an actuating means such as a piston or diaphragm. In a typical instance, the pressure on one side of the valve-actuating means is that at the inlet side of the main valve while the pressure on the other side of the actuating means is reduced in accordance with the condition of the medium which is regulated by the main valve. Such controlled reduction in pressure is commonly obtained from a by-pass around the main valve having a restricted opening to the inlet side of the main valve and having a pilot valve controlling the release of pressure from the by-pass to the outlet side of the main valve.

Valve-actuating means of the piston type are in many cases unsatisfactory because of leakage and wear, and tendency towards sticking; likewise, those of the diaphragm type are in many cases unsatisfactory, particularly because diaphragms have little extensibility and are inherently highly stiff. In fact, when diaphragms are used they are frequently made large in diameter in order that they will be capable of sufficient flexure to provide the necessary valve stroke and be flexible enough to permit a fairly sensitive regulating action; this has, however, resulted in bulky constructions which are wholly out of proportion to the size of the main valve.

In cases where a highly sensitive regulating action has been desired, a sensitive valve-actuating means has been employed which is either in the form of a diaphragm made of a highly compliant material such as a rubber composition or in the form of a metal bellows made for example of phosphor bronze. Of these two types of valve-actuating means the metal bellows is preferable because it is a compact form of device having both high flexibility and high extensibility; also a metal bellows is considerably more durable than the rubber-composition diaphragm unless the latter is made relatively heavy, in which case the flexibility and extensibility of the diaphragm will however be no longer comparable to those of a bellows. Highly sensitive forms of valve-actuating means have, however, been greatly restricted in use, as is now explained.

In many valve applications the initial pressure is high, being of the order of 200 or more pounds per square inch. When in such applications there is employed the usual by-pass and pilot valve arrangement for controlling the pressure differential across the valve-actuating means, as aforementioned, there may occur at times high pressure differentials across this actuating means. Since a highly sensitive valve-actuating means, such as a bellows or a flexible rubber-composition diaphragm, does not possess sufficient strength to withstand high pressure differentials, these actuating means have been generally limited to applications where the initial pressure is low and free from sudden increases. Thus in flow regulators, an adaptability to a wide range of applications and a high sensitivity have not gone hand in hand, but have rather been obtained at the expense of one to the other.

It is an object of my invention to provide a flow regulator which is both highly sensitive and applicable to a wide range of operating conditions without risk of damage to its parts.

It is another object to provide a pilot-type self-operated regulating device which is both highly sensitive and dependable in operation.

Another object is to provide a sensitive regulating device which is safely operable in lines where the pressure may vary through wide limits and attain high values.

Another object is to provide a small and rugged construction of self-operated regulating device having a high regulating capacity.

It is a further object to provide a protective means by which the pressure differential across the valve-actuating means may be limited to a predetermined value.

It will be understood that the features of my invention as above noted, are applicable to pilot-type self-operated regulating devices generally, such for example as to devices for regulating temperature, pressure, or supply of a fluid; and furthermore, that in view of these features the pressure at the inlet of the pilot valve may vary widely and attain high values.

It is another object of my invention to provide in pilot valve improvements by which the valves are rendered substantially completely balanced with respect to the pressures at their inlets.

It is also an object of my invention to provide highly accurate pilot valves sensitive substantially only to the condition of the medium controlled.

Another object is to provide pilot valves of improved construction and of improved sensitiveness and dependability of operation.

Various features of my invention reside in novel constructions and arrangements by which the abovementioned objects are attained.

Other and allied objects and features of my invention will more fully appear in the following description and the appended claims.

Figure 2:
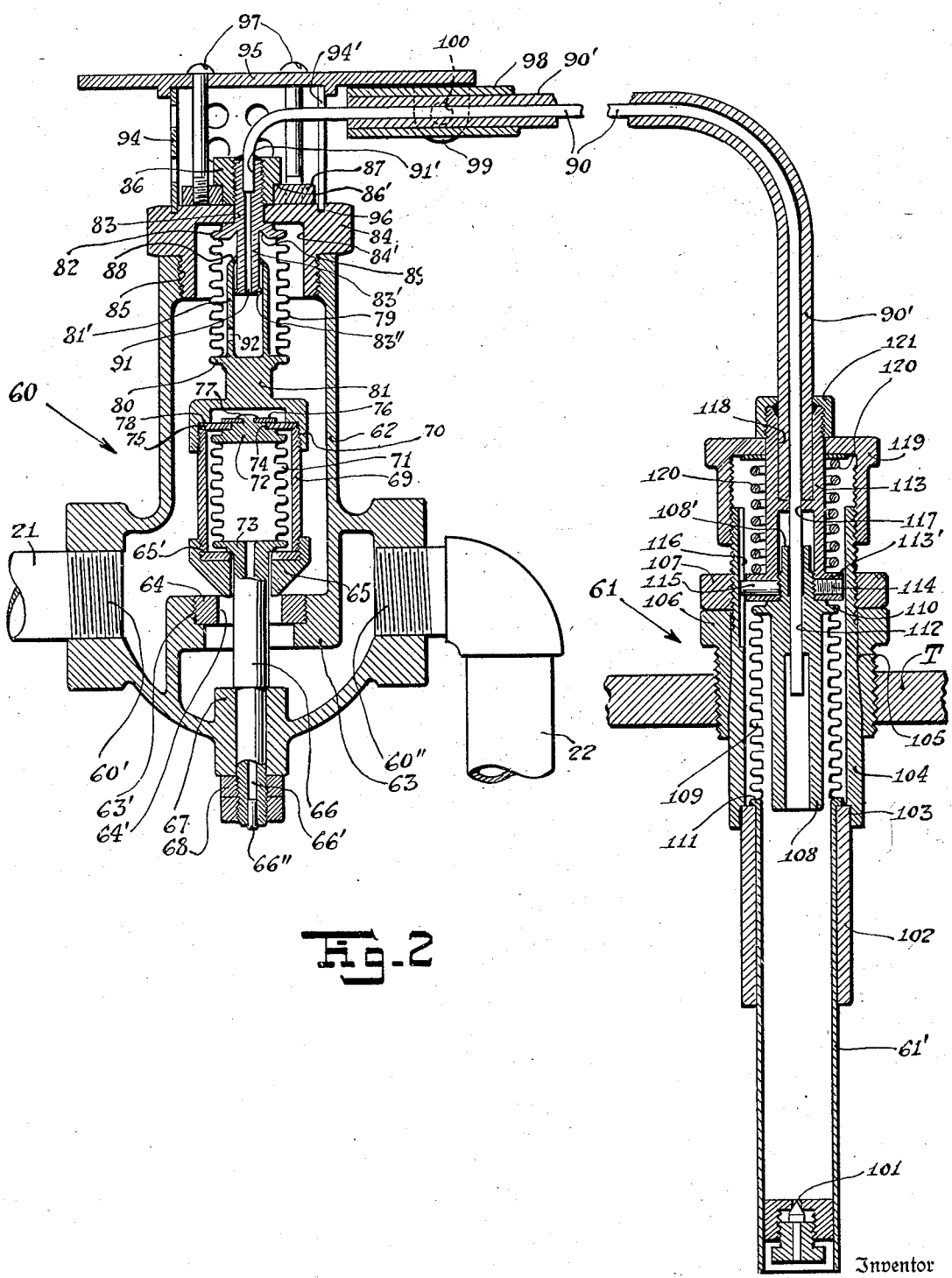

In the description of my invention reference is had to the accompanying drawings, of which:

Figure 1 is a view principally in section of a pilot-type self-operated pressure regulating device in which my invention is incorporated; and Figure 2 is a view principally in section of a thermostatically controlled pilot valve constructed in accordance with my invention; this pilot valve is particularly adapted for use with the main valve construction of Figure 1, with which construction it forms a pilot-type self-operated temperature controlling regulator.

The invention is illustrated in Figure 1 in connection with a pressure reducing regulator. This regulator comprises a main valve construction C having a main valve 1 disposed within a housing 2 provided with inlet and outlet ports 3 and 4. The main valve 1 is of a well-known balanced type (i. e., a type which is balanced with respect to the pressure at both its inlet and outlet) and is adapted to reduce the initial or supply pressure of the fluid at its inlet to a desired terminal or delivery pressure at its outlet; the valve is self-operated or actuated by the pressure of the fluid at its inlet and is controlled by a pilot valve 5, this pilot valve being operated and controlled by the pressure at the outlet of the main valve as is hereinafter explained. It will be understood that while I now illustrate my invention in connection with a particular type of pressure reducing regulator, no unnecessary limitation of my invention to this type of regulator is intended.

The self-operating or actuating means for the main valve 1 comprises an expansible and contractible means preferably in the form of a bellows 6. This bellows is disposed within a compartment formed by a circular base 7, having a downwardly extending boss 8 which is threaded into the housing 1, and by a casing 9, in the form of an inverted cup, which is secured fluid-tight by bolts 10 to a flange 7' of the base 7. A lower flange 6' of the bellows 6 is clamped against a raised portion or boss 7" of the base 7 but not necessarily in a way to effect a fluid-tight connection between the bellows and the base 7; this clamping is effected by way of an annular ring 11 which is fitted between the casing and the base within an annular recess 9' in the casing and over the boss 7" and flange 6' of the bellows (the ring being suitably split to permit it to be placed over the flange 6') and which is clamped tightly against the base by the bolting of the casing to the flange 7'. Extending upwardly from the base 7 within and throughout the greater part of the length of the bellows 6 is a hollow boss 12 and passing upwardly through this boss axially of the circular base 7 is a stem 13 of the main valve 1. This stem is coupled, in a manner hereinafter explained, to the upper head 14 of the bellows 6 and is biased downwardly, to normally hold the main valve closed, by means of a compression spring 15 coiled about the stem between the main valve and the top 12' of the boss 12.

In the structure just described there is formed a chamber 17 between the bellows 6 and the base 7 and another chamber 18 between the bellows and the casing 9. The difference in pressure between these chambers (i. e., the pressure differential across the bellows 6) determines the amount of expansion or compression of the bellows and therefore the extent of opening or closing of the main valve 1. This pressure differential may be obtained from a by-pass across the main valve and may be controlled by a pilot valve provided in the by-pass. A usual form of such by-pass may be realized by providing holes 19 in the top of the boss 12 (to form a communication between the inlet side of the main valve and the chamber 17) and other holes 20 in the head 14 of the bellows 6 (to form a communication between the chambers 17 and 18) and then by coupling the chamber 18 to the outlet side of the main valve through the pilot valve 5 as by way of a conduit 21 which connects the chamber 18 to the inlet port 5' of the pilot valve and a conduit 22 which connects the outlet port 5" of the pilot valve to a pipe 23 leading from the outlet side of the main valve, this latter connection being made, for example, by way of a T-coupling 24. The flow capacity of this by-pass, when the pilot valve 5 is fully open, is at least partially limited by the holes 20 between the chambers 17 and 18, and may typically be predominantly limited by these holes, by making the flow capacity of the holes 20 small in comparison to both that of the holes 19 and that of the coupling between the chamber 18 and the outlet of the main valve. As a result the internal pressure of the bellows will be substantially the same as the supply or initial pressure of the main valve; however, the external pressure of the bellows will be normally reduced because of the pressure drop across the restricted portion of the by-pass (i. e., across the holes 20 between the chambers 17 and 18), the amount of this reduction depending upon the degree of opening of the pilot valve 5 and upon the delivery pressure at the outlet of the main valve.

It will be seen that in the by-pass as just described the pressure drop across the bellows 6 will under static conditions be substantially the same as that across the main valve so long as the flow capacity of the by-pass is limited predominately by the restricted holes 20 between the chambers 17 and 18—i. e., in the present instance so long as the opening in the pilot valve is substantially greater than that of the holes 20 between these chambers. Because of such possible pressure relationship the actuating means for the main valve has had to be made strong, for example by the use of a stiff metal diaphragm, so as to be able to withstand the pressure differential across the main valve. When on the other hand a highly flexible actuating means such as a bellows has been employed, the regulator has been necessarily restricted in its use to applications where the supply pressure is low in order to avoid excessive strain of the actuating means. Thus, the bellows-type actuating means has been restricted to a very limited field.

It is, however, a feature of my invention to provide simple means which permit highly flexible yet inherently weak forms of valve-actuating means—such for example as the bellows-type actuating means—to be used without restriction with respect to the values of the supply and delivery pressures to and from the main valve or with respect to variations in these pressures. In accordance with this feature I am enabled to construct a compact form of regulator which is highly sensitive and which is yet wholly free from risk of damage to its parts even though it is subjected to a wide range of operating pressures. To effect these results I provide a relief valve between the chambers 17 and 18 (i. e., across the bellows 6 in shunt with the restricted portion of the by-pass) which has a capacity that is large in relation to the capacity which the by-pass across the main valve would have were there unrestricted communication across the bellows 6 between the chambers 17 and 18; this valve is normally held closed but is set to open whenever the pressure differential across the bellows exceeds a predetermined value somewhat in excess of that required to fully actuate the bellows 6.

The relief valve abovementioned, which appears as 25, is preferably provided in the head 14 of the bellows 6. This valve may comprise a seat ring 26 which may be fitted in a hole 14' in the head of the bellows and be held in place by a disk-shaped nut 27 which is threaded on the seat ring. The seat ring is provided centrally thereof with a valve port 28; cooperating with this port is a cone-shaped closure member 29 which is mounted on a reduced-diameter portion 13' of the valve stem 13, this portion 13' passing through the valve port 28. Threaded on the upper end of the portion 13' of the valve stem 13 and locked in place by a lock nut 30 is a circular member 31 in the form of a cup, the hub 31' of which bears against the closure member 29 to hold it firmly in place. This circular member impinges against the top of the casing 9 to limit the opening movement of the main valve. Interposed between the member 31 and the nut 27 on the seat ring is a compression spring 32 which presses the seat ring 26 against the closure member 29 to normally hold the relief valve closed, this relief valve being however opened whenever the differential pressure on the head of the bellows creates a force on the head sufficient to overcome that of the spring 32. In the circular member 31 there are provided relatively large holes 31'' so that the communication between the chamber 18 and the conduit 21 will not be restricted when the circular member is in contact with the top of the casing 9. The holes 20, which provide the restricted communication between the chambers 17 and 18 as aforementioned, are preferably provided in the closure member 29 as shown in Figure 1.

A regulator incorporating the relief valve just described may as a typical example have the following characteristics: The size of the bellows 6 may be of the order of four inches in diameter and four inches in height. A bellows of this size may be constructed to safely withstand a pressure differential of 20 pounds per square inch and to permit a valve stroke of one inch. The flexibility of such a bellows is large; in fact, the bellows may be expanded sufficiently to completely open a balanced type of valve such as the main valve 1, against the force of the valve-biasing spring 15, when the pressure differential across the bellows is only of the order of a pound per square inch. The relief valve may be set to open when the pressure differential across the bellows exceeds by a suitable margin that required to fully open the main valve, this differential pressure at which the relief valve is set to open being, however, well within the maximum differential pressure which the bellows is capable of withstanding. Thus the relief valve will limit the pressure differential across the actuating bellows 6 so as to prevent any undue strain of this bellows.

It is important that there occur no large sudden changes in pressure in the chamber 17 within the actuating bellows 6; this is because such pressure changes may produce large pressure differentials, of a transient nature, across the bellows by reason of the fact that there is necessarily some time lag in the distribution of a pressure change throughout the chamber 18 outside the bellows in response to a pressure change in the bellows. Consequently, I prefer that the communication between the inlet side of the valve and the chamber 17 within the bellows be somewhat restricted to prevent a too rapid rise in pressure in the bellows; this restriction may for example be provided by limiting the size of the holes 19 to about twice that of the holes 20 between the chambers 17 and 18.

It will be seen that while the relief valve 25 protects the actuating bellows 6 from damage it will in no way impair the normal operation of the regulator so long as the operation of the pilot valve 5 is independent of the pressure at its inlet—which is a characteristic of the pilot valve as is hereinafter explained; this is because a limiting of the pressure differential across the actuating bellows to some value which is in excess of that required to open the main valve will not affect the valve movement, for the valve is then already fully open, but will only prevent the actuating bellows from being subjected to unnecessarily high differential forces.

The ability of a pressure-reducing regulator to maintain a delivery pressure within narrow limits is, among other things as heretofore noted, dependent upon the accuracy and the sensitivity of the pilot valve. The degree of accuracy of the pilot valve may be represented by a factor expressing the ratio of the influence on the valve of the pressure at its outlet (i. e., the delivery pressure from the main valve) to the influence on the valve of spurious effects such for example as that of the pressure at its inlet; and the degree of sensitivity of the pilot valve may be represented by a factor expressing the ratio of change of valve opening per unit change in the pressure at the outlet of the valve. The product of these factors may then represent a figure of merit for the pilot valve. In the instant invention, the pilot valve 5 is so constructed as to have an exceptionally large figure of merit. First the factor representing the degree of accuracy of the pilot valve, as above defined, is made particularly large by a construction which renders the operation of the pilot valve wholly independent of the pressure of the fluid at its inlet; and secondly, the factor representing the degree of sensitivity of the pilot valve is made unusually large by a construction which permits the valve port to be made large (this port being permitted to be made large without a sacrifice in the accuracy of the regulator by reason of the construction which renders the operation of the pilot valve independent of the pressure of the fluid at its inlet). The construction of this pilot valve is now described.

The pilot valve 5 comprises a housing 33 having the inlet and outlet ports 5' and 5'' abovementioned, between which is located a partition 34. This partition has an opening 35 into which is threaded a valve seat 36 having a valve port 37. The valve port 37 is adapted to be closed by a valve throttle 38 which is slidably mounted on a guide post 39; this post passes axially through the valve port 37 and is extended through a boss 40 in the housing 33, to which the post is rigidly held by a nut 39' threaded on the outer end portion of the post.

In order that the operation of the pilot valve 5 will be independent of the pressure at its inlet it is balanced with respect to that pressure. The means by which this balancing is effected comprises an inverted cup-shaped casing 41 which is threaded onto the valve throttle 38 as at 42. This casing is closed at its top by a plug 43 which is held in place by a cylindrical nut 44. Within the casing between the plug 43 and a base 46 formed on the post 39 is a bellows 45. This bellows is sealed fluid-tight, as by soldering, to the base 46 and plug 43 and is filled with gas by way of a vent 47 running up through the post 39, which vent may be closed after the filling of the bellows by a plug 48. In this construction the effective diameter of the bellows 45 is made equal to the effective diameter of the valve throttle, which diameter is that of the lower flat face 38' of the throttle. This face 38' of the throttle is perforated by holes 49 so that the chamber 50 formed between the casing 41 and the bellows 45 will be in communication with the inlet side of the pilot valve. As a result, the forces exerted by the pressure at the inlet of the pilot valve against the top and bottom of the valve throttle 38 within the diameter of its face 38' will be equal and oppositely directed; likewise, the forces exerted within the casing 41 by the inlet pressure against the top of the casing and the area at the bottom of the casing beyond the valve face will be equal and oppositely directed. Thus the effect of the pressures exerted from the inlet side of the pilot valve upon the throttle 38 and casing 41 is reduced to a nullity; this reduction holds substantially completely regardless of the position of the throttle in its path, thereby rendering the pilot valve balanced at all times with respect to the pressure of the fluid at its inlet.

It will be seen that the fluid at the outlet of the pilot valve is in free communication with the exterior of the casing 41 and throttle 38 except for the face 38' of the throttle. Since the assembly of the throttle 38, casing 41 and bellows 45 is balanced with respect to the pressure exerted on the face 38', as just explained, this assembly becomes unbalanced with respect to the outlet pressure of the pilot valve to the extent of the force exerted by the outlet pressure on the head or top of the casing (i. e., at a place directly opposite the face 38' of the throttle) over an area equal to that of the face 38'. The force on the casing as created by this unbalance is effective to close the throttle 38.

The pressure in the bellows 45 acts to bias the throttle 38 into open position—which position is defined by the contact of the throttle with the base 46. Since the bellows 45 is typically small it will be able to withstand high pressure differentials; accordingly the biasing of the throttle 38 may be safely set at any predetermined value within a wide range by controlling the quantity of gas injected into the bellows. The biasing is preferably rendered readily adjustable either by reenforcing or counteracting the biasing effect of the bellows 45 as by a suitable spring. In the present instance, the bellows 45 is filled with a quantity of gas sufficient to hold the throttle open at the maximum delivery pressure which the regulator may be called upon to maintain, and counteracting the biasing effect of the bellows 45 is a compression spring 51 which is adjustable so that the pilot valve may be set to operate (i. e., to close) at preassigned delivery pressures below the maximum value just mentioned.

The compression spring 51 is positioned above the bellows 45 between a cap 52 threaded into the cylindrical nut 44 and an adjustable cap 53, and is disposed within a casing 54 which is coupled fluid-tight to the housing 33, the casing 54 having a flange 54' resting on an open end 33' of the housing and being held in place by an annular coupling 55 threaded onto the housing. Between the casing 54 and the housing 33 there is provided a partition 56 which has a central opening 56' through which slidably passes the cylindrical nut 44; this partition serves as a guide for the throttle assembly (i. e., the assembly including the throttle 38, the casing 41, nut 44 and cap 52). Into the top of the casing 54 there is provided a boss 57 through which is threaded a screw 58, the lower end of which fits into a recess 53' in the cap 53. This screw provides means for moving or adjusting the cap 53 to control the degree of compression of the spring 51 and therefore the net biasing of the throttle 38. Threaded over the boss 57 is a cover 59 which serves to close the top of the casing 54 fluid-tight.

Because the pilot valve 5 is so arranged as to be substantially wholly balanced with respect to the pressure of the fluid at its inlet the accuracy of the pilot valve will not be impaired when the diameter of the valve port 37 is made large. In unbalanced pilot valves such, for example, as those employing a diaphragm as the actuating means for the valve throttle, a fairly high degree of accuracy has been attained only by causing the ratio between the effective area of the diaphragm and that of the valve port to be large. Indeed in many typical instances this ratio has been so large that when the diaphragm is made as large as several inches in diameter the valve port is yet held in diameter to within a small fraction of an inch. However, in the present instance in view of the balanced character of the valve the diameter of the valve port may typically be an inch or more in diameter, thereby enabling the sensitivity factor for the valve to be made particularly large.

In Figure 2 there is shown a pilot valve 60, controlled by a thermostat 61, which may be connected in the by-pass across the main valve of Figure 1, in place of the pressure controlled pilot valve 5, so as to effect a pilot-type self-operated regulator for temperature controlling purposes. Such a regulator may for example be employed to control the temperature of liquid contained in a tank T (partially shown), which liquid may be heated by steam controlled by the main valve 1 and brought into thermal relation with the liquid in the tank in any desired manner. The thermostat 61 may be mounted on the tank T so that it will be maintained at the temperature of the liquid in the tank and thereby control the pilot valve in accordance with the temperature of this liquid. In such a temperature controlling regulator the main valve construction may be identical to the construction C heretofore described in connection with the pressure reducing regulator; accordingly there may be again obtained the advantages in sensitivity and safety of operation heretofore noted in connection with the main valve construction C.

The pilot valve 60, like the pilot valve 5, is constructed so as to have a large figure of merit both in respect of accuracy and sensitivity. In this case the factor expressing the accuracy of the pilot valve is made large by a construction which renders the operation of the valve independent of the pressures at both its inlet and outlet and subject substantially only to the temperature of the thermostat 61; and the factor expressing the sensitivity is made large by employing a volatilizing principle hereinafter explained.

The pilot valve 60 comprises a housing 62 which may be of the same general form as that of the housing 33 of the pilot valve 5; this housing has the inlet and outlet ports 60' and 60" between which there is provided a partition 63 having an opening 63'. The housing 62 is, however, oriented so that its inlet and outlet ports will be reversed from those of the pilot valve 5. (This is done, as hereinafter more fully explained, in order that the fluid at the inlet side of the valve will be in direct contact with the operating parts of the valve instead of the fluid at the outlet of the valve as is the case with the pilot valve 5.) Threaded into the opening 63' is a cylindrically-shaped valve seat 64 having a valve port 64' adapted to be closed by a cone-shaped throttle 65 which is loosely slidably mounted on a guide post 66; this post passes axially through the valve port 64' and is extended through a boss 67 in the housing 62 to which the post is rigidly held by a nut 68 threaded on the outer end portion of the post.

In order that the operation of the pilot valve will be independent of the pressures of the fluid at its inlet and outlet the valve is constructed so that it is balanced with respect to those pressures. The means by which the balancing of the valve with respect to its outlet pressure is accomplished comprises a cylinder 69 which is threaded at its bottom into circular recess 65' in the throttle 65 and which is closed at its top by a cap 70 threaded onto the cylinder. Within this cylinder there is provided a bellows 71 having a head 72 at its top and secured at its bottom to a base 73 formed on the top of the guide post 66, the bellows 71 being sealed airtight, as by soldering, to the head 72 and base 73. The head 72 has an upwardly extending boss 74 about which there is fitted an annular disk 75; this disk is swivellingly connected to the head by a washer 76 fitting about a short central post 77 on the boss and held in place by a peening of this post. Within the cap 70 there is provided an annular shoulder 78 which, when the cap is threaded onto the cylinder, bears against the rim of the disk 75 to hold it tightly against the upper end of the cylinder. It is seen that all exterior parts of the assembly just described—which exterior parts include the throttle 65, cylinder 69 and cap 70—are swivellingly connected to the head 72 of the bellows 71. This is done in order that during the assembling of the parts the bellows will be relieved of possible torsional strain.

In the structure just described the throttle 65 is fitted loosely on the guide post 66, as aforementioned, in order that the fluid at the outlet of the pilot valve may be in direct communication with the chamber formed between the cylinder 69 and bellows 71; also the effective diameter of the bellows 71 is made equal to that of the valve port 64'. In so doing there is realized from a functional standpoint the same conditions as are hereinbefore explained in connection with the pilot valve 5, in view of which the effect of the pressure at the outlet of the pilot valve 60 on the throttle 65 is completely nullified, thereby leaving the pilot valve balanced with respect to that pressure. The bellows 71 may not only make possible the balancing of the pilot valve with respect to its outlet pressure but may also, as in the case of the pilot valve 5, constitute a means for biasing the throttle 65 into open position— which position may be defined by the contact of the throttle with the base 73. This biasing may be set to any predetermined value by filling the bellows with gas by way of a vent 66' extending axially through the guide post 66, which vent may be closed by a plug 66" after the filling of the bellows.

The means for balancing the pilot valve 60 with respect to its inlet pressure comprises a bellows 79 (which serves also as a motor bellows as is hereinafter explained). This bellows is of the same effective diameter as that of the bellows 71 and is soldered at its bottom to a flange 80 provided on a boss 81 of the cap 70 and at its top to a flange 82 of a plug 83. The plug 83 extends axially through a cap 84 which is threaded as at 85 into the housing 62. The cap 84 has an interior recess 84' into which is disposed the flange 82 of the plug 83, the flange being firmly held against the top of the recess 84 by a nut 86 threaded onto the outer end portion of the plug. The nut 86 is provided at its bottom portion with an annular recess 86' so that the nut may fit an annular disk 87 to hold this disk in place at the top of the cap 84. In the construction here described the connections between the cap 84 and housing 62 and between the cap 84 and plug 83 are adapted to be fluid tight.

It will be seen that since the bellows 79 is provided with an effective diameter equal to that of the valve port 64' the surfaces on the throttle assembly—which assembly includes the throttle 65, cylinder 69, cap 70 and bellows 79—against which the inlet pressure acts to urge the throttle open are exactly equal to the surfaces against which the inlet pressure acts to urge the throttle closed, thereby leaving the pilot valve balanced with respect to its inlet pressure.

The upper portion of the throttle assembly is positively guided during the opening and closing of the throttle by a simple means comprising a boss 83' extending downwardly from the plug 83 within the bellows 79 and terminating into an abutment or knob 83", and a telescoping tubular portion 81' extending upwardly from the boss 81 within the bellows 79 and slidably fitting the knob 83". In order that this guiding means may also serve to prevent the bellows 79 from being strained by excessive stretching—as may be caused by the handling of the parts during the assembling of the pilot valve—the tubular portion 81' is peened inwardly at its top, as at 88, to form a stop with the knob 83". This peening is done very simply by providing a V-shaped recess 89 in the plug 83 at the juncture between the boss 83' and the flange 82, and by pressing the tubular portion 81' up into the recess 89 with an impact.

Coupling the pilot valve 60 with the thermostat 61 is a capillary tube 90 provided with a protective casing 90'. This tube is connected at one end to the bulb 61' of the thermostat in a manner hereinafter explained and is connected at the other end to the bellows 79, this latter connection being made by providing an axially extending opening through the plug 83, soldering the tube into a counterbore 91' of this opening, and then providing an opening 92 in the tubular portion 81' so that the chamber within the tubular portion 81' and the chamber between this tubular portion and the bellows 79 will be in free communication with one another. The thermostatic bulb 61' and capillary tube 90 are filled with liquid. As the temperature in the bulb rises and falls this liquid expands and contracts accordingly to cause liquid to be injected into the bellows 79 during a temperature rise and to be removed during a temperature drop. In cases where a highly sensitive pilot valve is desired the thermostat 61 and capillary tube 90 are completely filled with a volatile liquid adapted to volatilize at the operating temperature of the motor bellows. When the motor bellows is directly thermally exposed to the fluid from the inlet side of the pilot valve, in the manner as heretofore explained, its temperature will be substantially the same as that of the fluid controlled by the main valve; thus when a liquid is chosen for the motor system of the pilot valve that has a volatilizing temperature substantially below that of the fluid controlled by the main valve, the liquid introduced into the motor bellows 79 by the thermostat 61 will be volatilized immediately following its entry into the motor bellows. Since such volatilization is accompanied by a large expansion in volume it will cause the action of the pilot valve to be highly sensitive to the temperature of the thermostat. If, however, a highly sensitive pilot valve is not required the motor system for the pilot valve may be actuated by mere liquid expansion. In this case the liquid chosen for the thermostat 61 is one which will not volatilize at the operating temperatures of the pilot valve; when such a liquid is used not only the thermostat 61 and capillary tube 90 are completely filled with the liquid but also the motor bellows 79.

It is preferred that the volatilization principle be employed in the motor means of the pilot valve 60 since in the particular pilot valve as above described the use of this principle produces not only a high sensitivity but also an unusually high degree of accuracy. Since the throttle 65 is biased open by a closed gas chamber (that is, the bellows 71) this biasing will vary with temperature in accordance with the laws of a perfect gas. When the volatilization principle is employed in the motor means of the pilot valve the liquid in the bellows 79 will be completely vaporized immediately following its entry into the bellows. The pressure created in the motor bellows by this volatilization is prevented from backing up into the thermostat by reason of the thermostatic bulb 61' and capillary tube 90 being filled with liquid. Thus the motor bellows 79 constitutes in effect a closed gas chamber which also behaves according to the laws of a perfect gas. Since the temperature of the bellows 71 will be maintained substantially at the same value as that of the bellows 79— which temperature is that of the fluid entering the pilot valve—the pressure variations in the bellows 71 and 79, as caused by variations in the operating temperature of the pilot valve, will be equal and oppositely directed, thereby rendering the operation of the pilot valve independent of its own temperature so long as its temperature is high enough to maintain complete volatilization of the liquid introduced into the motor bellows 79. When the volatilization principle is not used the motor bellows 79 will be filled at all times with liquid as heretofore noted. This liquid will have a different thermal coefficient of expansion than that of the gas-filled bellows 71, and therefore the pilot valve will be somewhat sensitive to its own temperature.

When the volatilization principle is employed it is important that there be provided a cooling chamber at the juncture of the capillary tube 90 with the motor bellows 79 in order that the region of transition from gas to liquid in the motor system will be rather sharply defined. Such a cooling chamber may comprise a perforated cylinder 94, which may for example be made of monel metal. This cylinder is clamped between a cover plate 95 and the cap 84 (which cap is recessed as at 96 to receive the cylinder) by means of screws 97 which pass through the cover plate and thread into the annular disk 87. The cylinder 94 is slotted at at 94' to permit the capillary tube 90 to pass therethrough. The portion of the tube 90 and casing 90' just beyond the cylinder 94 is encased in an armor 98 and rigidly secured to the housing of the pilot valve in order that this portion of the tube may be protected from excessive strain, the securing of the armor to the housing being effected by the provision of a pair of lugs 99 turned down from the cover plate, between which the armor is soldered or clamped as by screws 100 threaded through the lugs.

The thermostat 61 is provided with the tubular bulb 61' having a normally closed inlet opening 101 at its lower end. The upper end portion of the bulb 61' is fitted into a sleeve 102 and the sleeve is in turn fitted into a counterbore 103 of cylindrical member 104, the joints between the bulb and the sleeve, and between the sleeve and the member 104 being each rendered fluid-tight as by soldering. The intermediate portion of the cylindrical member 104 is tapered to form a seat 105 for a rotatable union coupling 106 which is held on the seat 105 by a nut 107 threaded on the member 104, and the coupling 106 is externally threaded for attachment to a support as for example to the tank T aforementioned.

In order that the capacity of the bulb 61' may be varied it is closed at its top by an axially movable plunger 108, the plunger being sealed to the bulb by means of a bellows 109 soldered at one end to a flange 110 on the plunger and at the other end to a flange 111 at the top of the bulb 61'. The plunger 108 is provided with an axial opening 112 through which passes the capillary tube 90, the top portion of this opening being counterbored and filled with solder to provide an air-tight seal between the tube and the plunger. Threaded onto a neck portion 108' of the plunger is a cylindrically-shaped cap 113. This cap is provided with an outwardly flanged portion 113' at its lower end into which is threaded a set screw 114 which bears against the neck portion 108' of the plunger to hold the cap in place on the plunger. Also extending through the flanged portion 113' is a pin 115 the outer end portion of which slidably engages a longitudinally extending groove 116 in the inner wall of the cylindrical member 104. The engagement of the pin 115 with the groove 116 permits movement of the plunger longitudinally of the cylindrical member 104 but prevents relative turning between the plunger and member 104, thereby protecting the bellows 109 from torsional strain. The upper portion of the cap 113 is provided with an axial opening 117 through which passes the capillary tube 90. This opening is counterbored, as at 118, and fitted with the flexible casing 90', which casing is secured to the cap as by soldering. Threaded onto the top of the cylindrical member 104 is a nut 119 which slidably fits the upper end portion of the cap 113. Between this nut and the flange 113' on the cap is a compression spring 120 which urges the plunger inwardly of the thermostatic bulb 61', the inward movement of the plunger being however restricted by the contact between the nut 120 and a nut 121 threaded on the top of the cap 113. By an adjustment of the nut 119 on the cylindrical member 104 the plunger may be moved relative to the thermostatic bulb 61' to vary the capacity of the thermostat.

In the operation of the temperature controlling regulator hereinabove described the thermostat 61 may at times be subjected to unusually high temperatures, causing the pressure in the motor system of the pilot valve to reach inordinately high values. This may cause a rupture of the motor bellows 79, or of the bellows 109 in the thermostat, or even of the capillary tube 90. To prevent such damage to the motor system of the pilot valve I have provided a pressure relieving means in the form of the spring 120. This spring is set so that when the pressure in the motor system reaches an upper limit the spring will begin to yield to thereby prevent the pressure in the motor system from rising substantially above such limit.

Although I have herein shown and described my invention in terms of certain specific embodiments, it will be understood that these embodiments are subject to many changes and modifications without departure from the scope of my invention, which I understake to express according to the following claims.

I claim:

1. In a fluid-controlling device having a structure comprising a main valve movable between open and closed positions, an extensible and contractible means connected to said main valve and a controlled by-pass around said main valve including a pilot valve and having a restricted portion adapted to cause a localized pressure drop in the by-pass, said pressure drop being applied across said extensible and contractible means and actuating the latter to move the main valve between its said positions: the combination of a relief valve, disposed in shunt across the restricted portion of said by-pass, for limiting the pressure differential across said extensible and contractible means; and biasing means, carried with said main valve and without influence on the same, for holding said relief valve closed until the pressure differential across said extensible means reaches a value in excess, by a predetermined amount, of that required to cause said main valve to be moved through its range of movement.

2. In a structure having a main valve for controlling the flow of a heating fluid, a chamber, and extensible and contractible means connected to said main valve and forming a movable partition between said chamber and the inlet side of the main valve: the combination of a by-pass around the main valve including said chamber, said by-pass having a restricted portion between the inlet side of the valve and said chamber normally causing a pressure drop across said extensible and contractible means; a normally closed relief valve between said chamber and the inlet side of said main valve for limiting the pressure drop across said extensible and contractible means, said relief valve being opened in response to a pressure differential thereacross in excess of a predetermined amount and causing the minimum pressure in said chamber to be not below the pressure at the inlet side of the main valve by more than to the extent of said predetermined amount; and a thermostatically controlled pilot valve in said by-pass for controlling the flow of fluid from said chamber to the outlet side of said main valve, said pilot valve comprising means causing the valve to be balanced with respect to the pressure at its inlet side whereby to render the operation of the pilot valve independent of variations of the pressure within said chamber.

3. In a structure for reducing pressure comprising a main valve, a by-pass around said valve having a restricted opening to the inlet side of the valve, a chamber communicating with said by-pass, and an extensible and contractible member associated with said valve and forming a partition between said chamber and the inlet side of the valve: the combination of a normally closed relief valve between said chamber and said inlet side of the main valve, openable in response to a pressure differential across said extensible and contractible member in excess of a predetermined amount and causing the minimum pressure in said chamber to be not below the pressure at said inlet side of the main valve by more than to the extent of said predetermined amount; and a normally open pilot valve in said by-pass between said chamber and the outlet side of said main valve closeable in response to the pressure at its outlet, said pilot valve comprising means rendering the valve balanced with respect to the pressure at its inlet whereby to render the operation of the pilot valve independent of the pressure in said chamber.

4. In a structure having a main valve for controlling the flow of a heating fluid, a chamber, and extensible and contractible means connected to said main valve and forming a movable partition between said chamber and the inlet side of the main valve: the combination of a by-pass around the main valve including said chamber, said by-pass having a restricted portion between the inlet side of the valve and said chamber normally causing a pressure drop across said extensible and contractible means; a pilot valve in said by-pass between said chamber and the outlet side of said main valve, adapted to respond to the condition of a medium to be regulated and to thereby control the release of pressure from said chamber in accordance with the condition of said medium; and means within said pilot valve for balancing the latter with respect to the pressure at its inlet whereby to render the controlling action of the pilot valve independent of the pressure in said chamber, comprising a movable vessel disposed in the outlet side of the pilot valve and provided with an apertured base forming a throttle for the pilot valve, and a bellows within said vessel having end walls relatively movable in the direction of movement of said vessel, one of said end walls being fixed and the other being secured to said vessel on the side thereof directly opposite said apertured base, and the effective diameter of said bellows being equal to the effective diameter of said valve throttle.

5. In a structure having a main valve for controlling the flow of a fluid, a chamber, and extensible and contractible means connected to said main valve and forming a movable partition between said chamber and the inlet side of the valve: the combination of a controlled by-pass around said main valve adapted to provide a differential pressure across said extensible and contractible means to actuate the same, said by-pass including said chamber and having a restricted portion between the inlet of the main valve and said chamber and a pilot valve between said chamber and the outlet of the main valve, said restricted portion being adapted to cause the pressure in said chamber to be normally substantially lower than the pressure at the inlet of the main valve, the pressure in said chamber however attaining the value of the pressure at the inlet of the main valve when said pilot valve is fully closed; and means included within said pilot valve for balancing the pilot valve with respect to the pressure at its inlet whereby to render the operation of the pilot valve substantially wholly independent of the pressure in said chamber.

6. In a fluid regulator including a main valve and an extensible and contractible means connected with said valve: the combination of means for utilizing the supply pressure of the fluid to the regulator for actuating said extensible and contractible means to operate said main valve, including a by-pass leading from the inlet of the regulator and having a restriction therein and a pilot valve at its outlet, said by-pass being adapted to cause the pressure drop across said restriction to be applied across said extensible and contractible means; a relief valve in shunt with said by-pass restriction to limit the pressure drop across said extensible and contractible means; and means between the inlet of said regulator and said extensible and contractible means having an opening therein forming the inlet of said by-pass, said opening being restricted to impede the transfer of sudden changes of supply pressure to said extensible and contractible means.

7. In a fluid-regulating device including a casing having inlet and outlet ports and a regulating valve in the passageway between said ports: the combination of a by-pass leading from the inlet side of said valve and having a substantial pressure drop therein; a localized pressure-reducing restriction in said by-pass; a movable wall means coupled to said regulating valve and actuated by the pressure differential across said restriction; a pilot valve disposed in said by-pass in serial arrangement with said restriction and controlled in response to variations in the condition of a predetermined medium, said pilot valve operating to proportion between it and said restriction the total pressure drop thereacross whereby to control the pressure differential across said movable wall means; and means included in said pilot valve rendering the same insensitive to variations in pressure at its inlet whereby to cause said control valve to be controlled independently of the absolute pressure of the fluid in said by-pass between said restriction and the pilot valve.

8. In a fluid-regulating device including a casing having inlet and outlet ports and a regulating valve in the passageway between said ports: the combination of a by-pass leading from the inlet side of said valve and having a substantial pressure drop therein; a localized pressure-reducing restriction in said by-pass; a movable wall means coupled to said regulating valve and actuated by the pressure differential across said restriction; a pilot valve disposed in said by-pass in serial arrangement with said restriction and controlled in response to variations in the condition of a predetermined medium, said pilot valve operating to proportion between it and said restriction the total pressure drop thereacross whereby to control the pressure differential across said movable wall means; a safety relief valve across said restriction actuatable in response to a pressure differential across the same in excess of a predetermined value for limiting the maximum pressure differential across said movable wall means; and means included in said pilot valve for rendering the operation of the same independent of the absolute pressure at its inlet whereby actuations of said relief valve are rendered substantially without influence on the operation of said regulating valve.

9. In a fluid-controlling device having intercommunicating inlet and outlet ports, a main valve disposed in the passageway between said ports and extensible and contractible means connected to said valve and actuated by the pressure of the fluid at said inlet port to operate the valve: the combination of a chamber partitioned from said inlet port by said extensible and contractible means and having a restricted inlet passageway to said inlet port; a pilot valve for controlling the escape of fluid from said chamber; a relief valve between said chamber and said inlet port for limiting the pressure differential across said extensible and contractible means; and separate independently acting biasing means for said main valve and relief valve respectively.

10. In a fluid-controlling device having intercommunicating inlet and outlet ports, a main valve disposed in the passageway between said ports and extensible and contractible means actuated by the pressure of the fluid at said inlet port to operate the valve: the combination of a chamber partitioned from said inlet port by said extensible and contractible means and having a restricted inlet passageway to said inlet port; a pilot valve for controlling the escape of fluid from said chamber; a relief valve between said chamber and said inlet port for limiting the pressure differential across said extensible and contractible means; and resilient means biasing said relief valve closed and operatively coupling said extensible and contractible means with said main valve.

11. In a fluid-controlling device including a casing having inlet and outlet ports, a main valve in the passageway between said ports and an extensible and contractible member for operating said valve: the combination of means for applying a differential pressure across said extensible and contractible member to actuate the same; a relief valve operatively connected across said extensible and contractible member to limit said differential pressure; resilient means operatively connecting said extensible and contractible member with said main valve and biasing said relief valve closed; and resilient means interposed between said casing and said main valve and operating on the latter in opposition to the actuations of said extensible and contractible member.

12. In a fluid-controlling device including a casing having inlet and outlet ports, a main valve in the passageway between said ports and an extensible and contractible member for operating said valve: the combination of means for applying a differential pressure across said extensible and contractible member to actuate the same; a valve seat on said main valve; a valve member secured to said extensible and contractible member, said valve member cooperating with said valve seat to form a relief valve for limiting the differential pressure across said member; and a spring carried bodily with said main valve and interposed between said main valve and said valve member for coupling said member to said main valve and for normally holding said relief valve closed.

13. In a fluid-controlling device including a casing having inlet and outlet ports, a main valve in the passageway between said ports and an extensible and contractible member for operating said valve: the combination of means for applying a differential pressure across said extensible and contractible member to actuate the same; a valve stem on said main valve projecting through said extensible and contractible member; a valve seat on said stem; an annular valve member surrounding said stem and secured to said extensible and contractible member, said valve member cooperating with said valve seat to form a relief valve for limiting the differential pressure across said member; a stop member secured to said stem and adapted to abut against an interior wall of said casing to limit the travel of said main valve; and resilient means interposed between said stop member and said valve member for pressing the latter against said valve seat to normally hold said relief valve closed.

14. In a fluid regulator including a casing having a fluid passageway and a main valve in said passageway: the combination of an extensible and contractible member connected with said main valve and actuated by a differential in pressure applied to the opposite sides thereof; a relief valve for limiting the differential pressure across said member; a biased spring acting to yieldably hold said relief valve closed and required to be actuated against its own bias to permit said relief valve to open; a fixed wall in said casing; and means on said main valve constraining said resilient means and adapted to abut against said fixed wall to limit the travel of the main valve.

15. In a fluid regulator including a casing having a fluid passageway and a main valve in said passageway: the combination of an extensible and contractible valve-operating member actuated by the differential in pressure applied to the opposite sides thereof; a valve seat carried with said main valve; a valve member secured to said extensible and contractible member and cooperating with said valve seat to form a relief valve for limiting the differential pressure across said extensible and contractible member; a fixed wall in said casing; a stop member secured to said main valve and adapted to abut against said fixed wall to limit the travel of said main valve; and a biased spring acting at one end on said valve member to normally hold said relief valve closed and constrained at the other end by said stop member, said spring being required to be actuated against its own bias to enable said relief valve to be opened.

EMIL T. JOHNSON.